US005204699A

United States Patent [19]

Birnbaum et al.

[11] Patent Number: 5,204,699

[45] Date of Patent: Apr. 20, 1993

[54] APPARATUS FOR ESTIMATING TONER USAGE

[75] Inventors: David Birnbaum, Pittsford; Steven M. Palermo; Douglas A. Ross, both of Rochester, all of N.Y.

[73] Assignee: Xerox Corporation, Stamford, Conn.

[21] Appl. No.: 944,623

[22] Filed: Sep. 14, 1992

[51] Int. Cl.[5] ..................... G01D 15/14; G03G 15/06; G03G 15/04

[52] U.S. Cl. .................................... 346/160; 355/208; 355/246

[58] Field of Search ........................ 355/246, 208, 245; 346/160; 118/688-690

[56] References Cited

U.S. PATENT DOCUMENTS

| | | | |
|---|---|---|---|
| 3,409,901 | 11/1968 | Dost et al. . | |
| 3,960,444 | 6/1976 | Gundlach et al. | 355/3 DD |
| 4,065,031 | 12/1977 | Wiggins et al. | 222/56 |
| 4,326,646 | 4/1982 | Lavery et al. | 118/691 X |
| 4,348,099 | 9/1982 | Fantozzi . | |
| 4,660,059 | 4/1987 | O'Brien | 346/157 |
| 4,721,978 | 1/1988 | Herley | 355/4 |
| 4,847,659 | 7/1989 | Resch, III | 355/202 |
| 4,908,666 | 3/1990 | Resch, III | 355/246 |
| 5,057,866 | 10/1991 | Hill, Jr. et al. | 355/200 |
| 5,119,132 | 6/1992 | Butler | 355/208 |

OTHER PUBLICATIONS

"A Toner Dispening Control System"; Loeb; Xerox Disclosure Journal; vol. 6, No. 6, Nov./Dec. 1981, pp. 319-320.

*Primary Examiner*—R. L. Moses
*Attorney, Agent, or Firm*—Duane C. Basch

[57] ABSTRACT

The present invention is an apparatus and method adaptable for use in a printing system, to measure the mass of toner developed on an electrostatic latent image produced therein. The printing system employs an electrostatic process to produce a printed sheet in response to a plurality of image intensity signals. The toner mass measuring apparatus sums a plurality of individual toner mass signals, generated as a function of the image intensity signals, to approximate the toner mass used to develop the electrostatic latent image.

21 Claims, 3 Drawing Sheets

APPARATUS FOR ESTIMATING TONER USAGE

This invention relates generally to monitoring the usage of toner in a printing machine, and more particularly to an apparatus for estimating the mass of toner particles which are used to develop an electrostatic latent image based upon the level of the electrical image signals used to generate the latent image.

BACKGROUND OF THE INVENTION

Generally, the process of electrophotographic printing includes charging a photoconductive member to a substantially uniform potential to sensitize the surface thereof. The charged portion of the photoconductive surface is then exposed to a light image corresponding to the copy desired to be reproduced. This exposure records an electrostatic latent image on the photoconductive surface. After the electrostatic latent image is recorded on the photoconductive surface, the latent image is developed by bringing a developer mixture into contact therewith. A common type of developer comprises carrier granules having toner particles adhering triboelectrically thereto. The two-component mixture is brought into contact with the photoconductive surface, where the toner particles are attracted from the carrier granules to the latent image. This forms a toner powder image on the photoconductive surface which is subsequently transferred to a copy sheet. The toner powder image is then heated to fuse it to the output sheet.

The ionographic printing process also produces an electrostatic latent that is subsequently developed, transferred and fused. However, in the ionographic process the latent image is produced on an insulating charge receiving member. The charge receiving member collects the charge, in the form of charged ions, which are output from an ion generating print head in response to an image intensity signal.

When electrophotographic or ionographic printing systems are used, it is generally necessary to monitor and regulate the mass of toner which is transferred to the latent electrostatic image. This is important to control not only the quality of the prints made by the systems, but also to enable adjustment of those subsystems which are affected as a result of the amount of toner used to develop an image. Furthermore, the monitoring and control requirements are multiplied in modern multicolor printing machines. For example, U.S. Pat. No. 3,960,444 to Gundlach et al. (Issued Jun. 1, 1976) and U.S. Pat. No. 4,660,059 to O'Brien (Issued Apr. 21, 1987), both of which are hereby incorporated by reference, disclose multicolor electrophotographic and ionographic printing machines, respectively. Various approaches have been devised to estimate and control toner concentration in the developer or the amount of toner used to develop an electrostatic latent image, the following disclosures appear to be relevant:

U.S. Pat. No. 3,409,901
Patentee: Dost et al.
Issued: Nov. 5, 1968
U.S. Pat. No. 4,065,031
Patentee: Wiggins et al.
Issued: Dec. 27, 1977
U.S. Pat. No. 4,721,978
Patentee: Herley
Issued: Jan. 26, 1988
U.S. Pat. No. 4,847,659
Patentee: Resch, III
Issued: Jul. 11, 1989
U.S. Pat. No. 4,908,666
Patentee: Resch, III
Issued: Mar. 13, 1990
A Toner Dispensing Control System
by Alfred M. Loeb
Xerox Disclosure Journal, Vol. 6, No. 6 (Nov./Dec. 1981)

The relevant portions of the foregoing patents and disclosure may be briefly summarized as follows:

U.S. Pat. No. 3,409,901 discloses a xerographic system in which a toner concentration control system feeds toner to the developing mechanism in proportion to the area and density of the print. A cathode-ray tube (CRT) is used to expose a photoconductive member, and the signal which drives the CRT is also provided to a toner feed signal means where the signal is summed. When the signal exceeds a predetermined level an output signal is generated to cause toner to be dispensed into the developer mechanism.

U.S. Pat. No. 4,065,031 describes a device for regulating the dispensing of toner particles to a developer mix. During the operation of an electrostatographic printing machine a sensing mechanism, including a photosensor for determining the density of toner developed on a photoreceptor, outputs signals indicative of the toner concentration. The signals are summed and processed to determine if additional toner should be added to the developer mix.

U.S. Pat. No. 4,721,978, the relevant portions of which are hereby incorporated by reference, discloses an apparatus for controlling the concentration of toner particles used to form a highlight color document. Three signals are generated and processed to regulate the dispense rate of toner particles used to form the highlight color portion of the output document. The first signal is an indication of the percentage of the document area arranged to have color highlighted portions thereon. The second signal corresponds to the rate of toner particle usage per document, as determined by a central processing unit, and the third signal indicates the number of copies to be produced. To determine the amount of highlight color toner used, the three signals are multiplied, the product of the signals being used as a control signal which corresponds to the required dispense rate.

U.S. Pat. No. 4,847,659 describes an electrostatographic machine which replenishes toner in a developer mix in response to a toner depletion signal which represents the toner usage rate. The toner depletion signal is determined from the number of character print signals applied to a print head, or in other words, the number of pixels to be toned. The depletion signal is used in conjunction with a second signal, which represents a proportional toning contrast, such that the constant of proportionality between the toner depletion signal and a toner replenishment signal is adjusted according to the second signal.

U.S. Pat. No. 4,908,666 teaches a toner replenishment control structure which operates in one of two control states to control contrast characteristics when using developers having two developer materials. The first developer material exhibits contrast characteristics which vary with concentration and the second developer material does not exhibit contrast variation due to concentration variance. The system has a first control state for replenishing the first developer material as a function of a concentration signal and a second control state for replenishing the second developer material as a function of a contrast signal.

Loeb describes a toner dispensing control system that relies upon an intensity signal, representing the intensity of light reflected from the surface of an original document, and a developed density signal to produce an error signal. Subsequently a combination signal is produced as a function of the error signal, in accordance with a predetermined algorithm, to control the dispensing of toner to the developer material.

SUMMARY OF THE INVENTION

In accordance with the present invention, there is provided an apparatus for estimating the mass of toner particles developed on a latent electrostatic image. The apparatus includes converting means for approximating the mass of the toner required to develop an output pixel as a function of the image intensity signal which is used to control the exposure of the output pixel. Also included is summing means, responsive to the toner mass signal, which determines the sum of the approximated toner mass over a plurality of output pixels, thereby producing a sum signal representing the estimated toner mass developed on the output pixels.

In accordance with another aspect of the present invention, there is provided an electrostatic printing machine of the type having an insulating member. The printing machine comprises means for supplying a plurality of image intensity signals, and means, responsive to the image intensity signals, for recording an electrostatic latent image on the insulating member, with the electrostatic latent image having a plurality of output pixel spots, whereby the charge level of each output pixel spot is controlled in response to the associated image intensity signal. The printing machine also includes developing means for developing the electrostatic latent image recorded on the insulating member with toner to produce a developed image on the insulating member, and means for estimating the mass of toner adhering to the insulating member as a function of the image intensity signals.

In accordance with yet another aspect of the present invention, there is provided a method of estimating the mass of toner developed on an electrostatic latent image. The toner mass estimating method comprises the steps of: a) generating a toner mass signal approximating a toner mass developed by a latent output pixel of the latent image as a function of a greyscale image intensity signal used to control the formation of the latent output pixel; and b) determining, in response to the toner mass signal generated in step (a), a sum of the approximated toner mass for a plurality of output pixels to produce a sum signal.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

Figure 3:
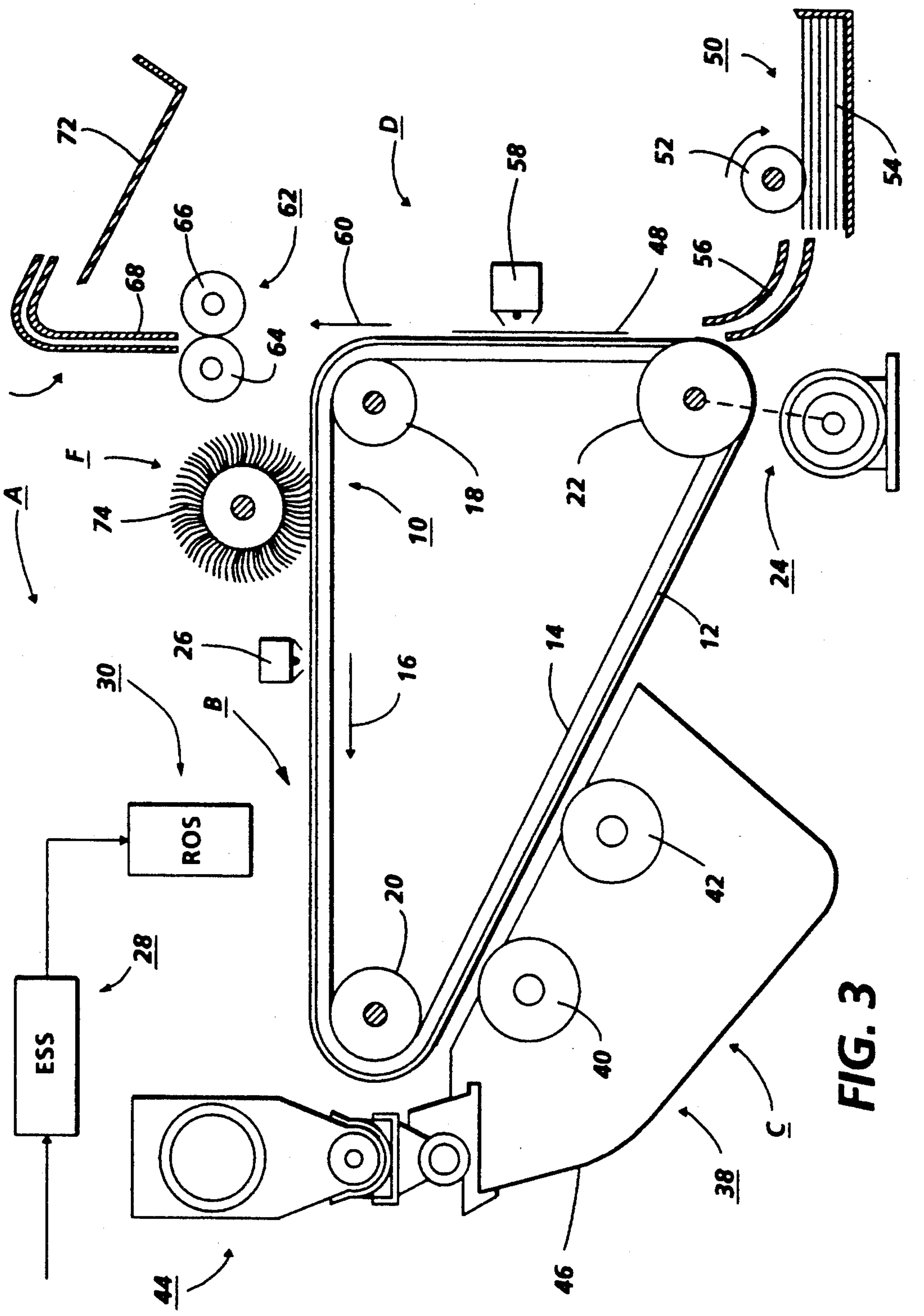
FIG. 3 is a schematic elevational view of an illustrative single color electrophotographic printing machine incorporating the features of the present invention therein.

For a general understanding of the operation of the developer usage measurement apparatus of the present invention, reference is made to the drawings. In the drawings, like reference numerals have been used throughout to designate identical elements. FIG. 3 schematically illustrates an electrophotographic printing machine which generally employs a belt 10 having a photoconductive surface 12 deposited on a conductive ground layer 14. Preferably, photoconductive surface 12 is made from a photoresponsive material, for example, one comprising a charge generation layer and a transport layer. Conductive layer 14 is made preferably from a thin metal layer or metallized polymer film which is electrically grounded. Belt 10 moves in the direction of arrow 16 to advance successive portions of photoconductive surface 12 sequentially through the various processing stations disposed about the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges the photoconductive surface, 12, to a relatively high, substantially uniform potential. After photoconductive surface 12 of belt 10 is charged, the charged portion thereof is advanced through exposure station B.

At an exposure station, B, an electronic subsystem (ESS), indicated generally by reference numeral 28, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 28 is a self-contained, dedicated minicomputer. The image signals transmitted to ESS 28 may originate from a computer, thereby enabling the electrophotographic printing machine to serve as a remotely located printer for one or more computers. Alternatively, the printer may serve as a dedicated printer for a high-speed computer. The signals from ESS 28, corresponding to the continuous tone image desired to be reproduced by the printing machine, are transmitted to ROS 30. ROS 30 includes a laser with rotating polygon mirror blocks. Preferably, a nine facet polygon is used. The ROS illuminates the charged portion of photoconductive belt 20 at a resolution of about 300 pixels per inch. The ROS will expose the photoconductive belt to record an electrostatic latent image thereon corresponding to the continuous tone image received from ESS 28. As an alternative, ROS 30 may employ a linear array of light-emitting diodes (LEDs) arranged to illuminate the charged portion of photoconductive belt 20 on a raster-by-raster basis.

Similarly, ROS 30 might also comprise an ion projection device suitable for modulating the ionographic output of the device in accordance with the level of the continuous tone image signals provided from ESS 28. In such an embodiment, belt 10 may be any flexible electrostatically insulating material as photoresponsiveness would not be required to produce the electrostatic latent image. It is important to note that the exposure element utilized in ROS 30 is not critical, rather it is the requirement that the exposure device used be responsive to the multiple level (greyscale) image intensity signals in such a manner so as to cause a variation in the charge potential deposited on the surface of belt 10 which corresponds to the image intensity signal.

In another embodiment, ESS 28 may be connected to a raster input scanner (RIS). The RIS has an original document positioned thereat. The RIS has document illumination lamps, optics, a scanning drive, and photosensing elements, such as an array of charge coupled devices (CCD). The RIS captures the entire image from the original document and converts it to a series of raster scanlines which are transmitted as electrical signals to ESS 28. ESS 28 processes the signals received from the RIS and converts them to greyscale image intensity signals which are then transmitted to ROS 30. ROS 30 exposes the charged portion of the photoconductive belt to record an electrostatic latent image thereon corresponding to the greyscale image signals received from ESS 28.

After the electrostatic latent image has been recorded on photoconductive surface 12, belt 10 advances the latent image to a development station, C, where toner, in the form of liquid or dry particles, is electrostatically attracted to the latent image using commonly known techniques. Preferably, at development station C, a magnetic brush development system, indicated by reference numeral 38, advances developer material into contact with the latent image. Magnetic brush development system 38 includes two magnetic brush developer rollers 40 and 42. Rollers 40 and 42 advance developer material into contact with the latent image. These developer rollers form a brush of carrier granules and toner particles extending outwardly therefrom. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 3, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a feed roll 52 contacting the uppermost sheet of stack 54. Feed roll 52 rotates to advance the uppermost sheet from stack 54 into chute 56. Chute 56 directs the advancing sheet of support material into contact with photoconductive surface 12 of belt 10 in a timed sequence so that the toner powder image formed thereon contacts the advancing sheet at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 onto a conveyor (not shown) which advances sheet 48 to fusing station E.

The fusing station, E, includes a fuser assembly, indicated generally by the reference numeral 62, which permanently affixes the transferred powder image to sheet 48. Fuser assembly 60 includes a heated fuser roller 64 and a back-up roller 66. Sheet 48 passes between fuser roller 64 and back-up roller 66 with the toner powder image contacting fuser roller 64. In this manner, the toner powder image is permanently affixed to sheet 48. After fusing, sheet 48 advances through chute 68 to catch tray 72 for subsequent removal from the printing machine by the operator.

After the print sheet is separated from photoconductive surface 12 of belt 10, the residual developer particles adhering to photoconductive surface 12 are removed therefrom at cleaning station F. Cleaning station F includes a rotatably mounted fibrous brush 74 in contact with photoconductive surface 12. The particles are cleaned from photoconductive surface 12 by the rotation of brush 74 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the features of the present invention therein. Moreover, while the present invention is described in the embodiment of a single color printing system, there is no intent to limit it to such an embodiment. On the contrary, the present invention is intended for use in multi-color printing systems as well.

Figure 1:
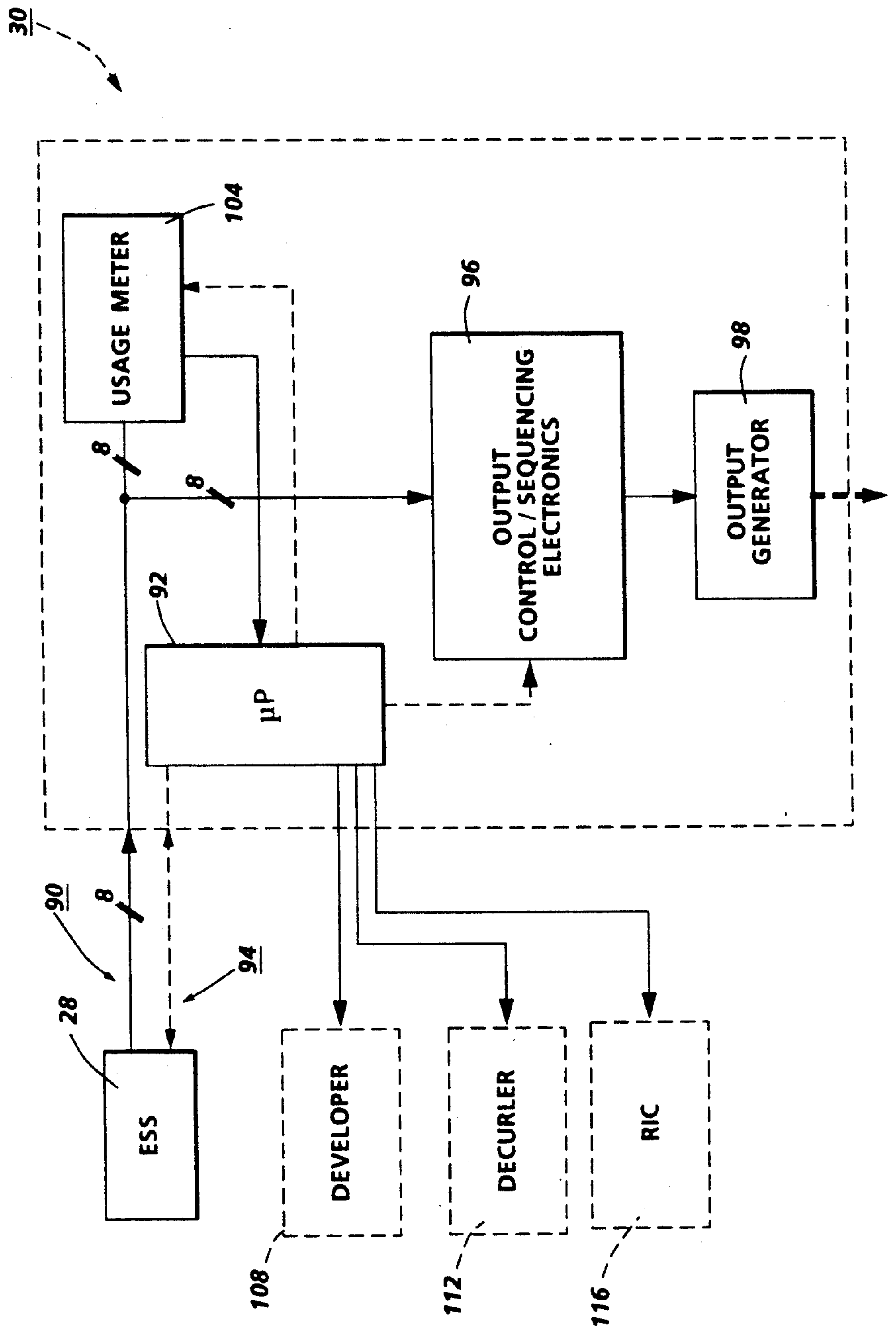
FIG. 1 is a block diagram illustrating the electrophotographic imaging system used in FIG. 3.

Referring now to FIG. 1, there is shown a block diagram of a ROS subsystem incorporating the preset invention, where ROS 30 is illustrated as receiving greyscale image intensity signals on input lines 90. The input lines are capable of providing a parallel, multi-bit greyscale image signal, for example, an 8-bit signal, to represent the desired intensity of the desired output pixel spot. Once received, ROS 30 processes the signal under the control of microprocessor 92, which is in communication with ESS 28 via control lines 94. The greyscale image signals are sent to the output control/sequencing electronics represented by block 96. In block 96, the signals are converted to an analog electrical signal which in turn drives output generator 98 to control the ROS exposure level.

As previously indicated, the ROS exposure mechanism may be any one of a number of exposure devices, for example, a scanning laser, an array of light emitting diodes, or a multiple element ionographic printhead. Output generator 98 may comprise any one of these exposure mechanisms and would thereby produce a latent image pixel spot having a charge potential which is proportional to the analog output signal, and in turn the greyscale image intensity signal.

Figure 2:
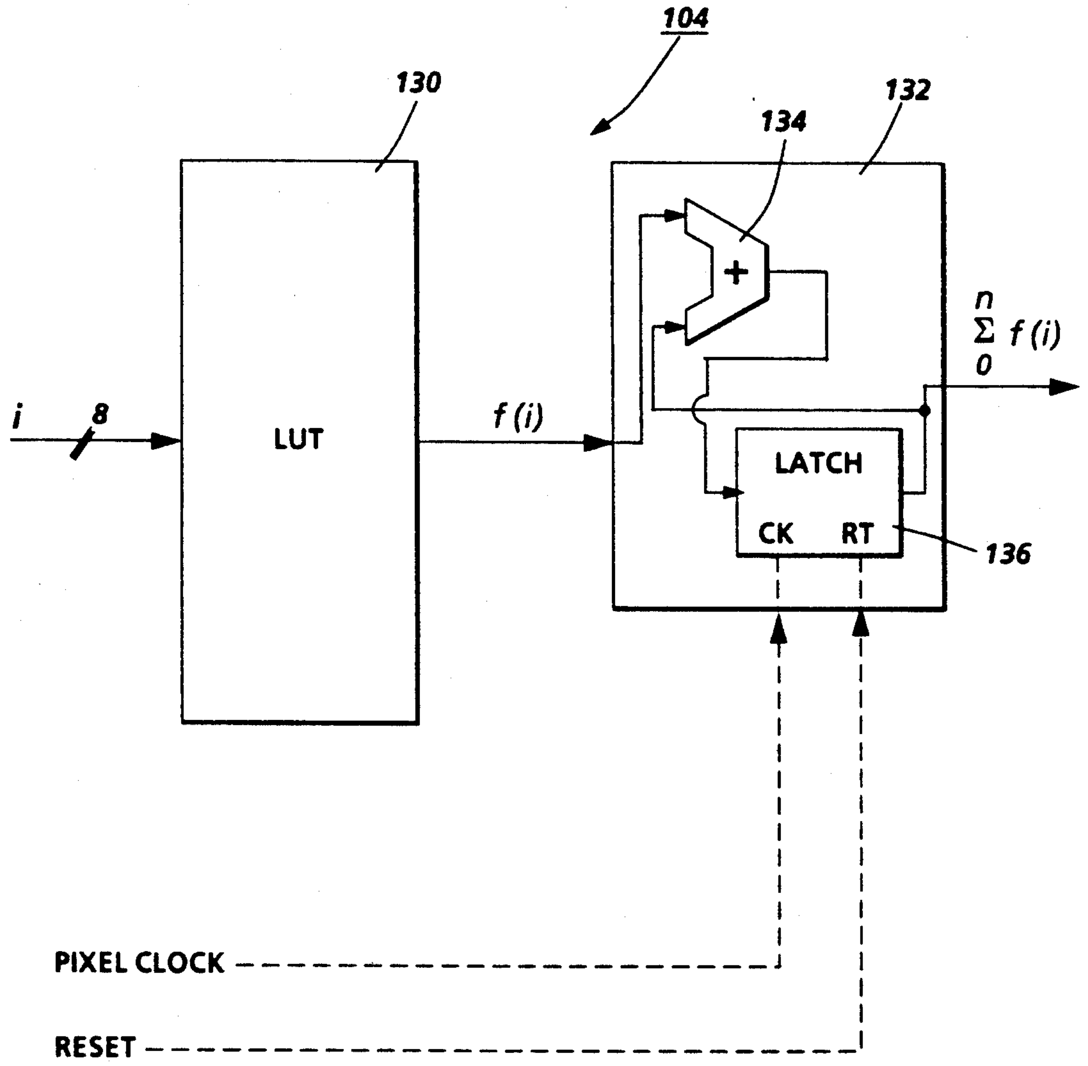
FIG. 2 is a simplified block diagram of an embodiment of the usage meter of FIG. 1.

Usage meter 104 is also included in ROS 30 and is connected directly to the image intensity input lines to receive the same multi-bit greyscale image signal that was passed to the output control/sequencing electronics in block 96. Usage meter 104, as depicted in FIG. 2, generally comprises a conversion block, represented as look-up table (LUT), 130, and a summation block 132. The multi-bit image intensity signal (i) is input to the conversion block, which is preferably a programmable read-only memory device (PROM) capable of operating at or above the rate of the ROS, where the signal is converted to a corresponding toner mass. In other words, LUT 130 receives image intensity signal i and converts it to a toner mass signal f(i) in accordance with a predetermined function which is implemented by the look-up table. As an alternative, the conversion block may comprise an arithmetic logic unit having a mapping or conversion function preprogrammed therein to generate the toner mass signal in response to the greyscale image intensity signal.

The predetermined function, also referred to as f(i), is generally a monotonic non-linear function that is determined empirically. More specifically, function f(i) is determined by developing uniformly charged regions, produced using a common image intensity level, and measuring the mass of toner attracted thereto. The toner mass is then divided by the area of the region, represented as the number of output pixels within the region, to arrive at a toner mass per output pixel. The process is repeated over the range of all possible image signal levels to produce the conversion function.

Once the toner mass signal, f(i), is output, summation block 132 receives the signal and sums the toner mass signal with a previously stored total toner mass to produce the summed output, Σf(i), in response to a pixel clock signal which establishes the occurrence of a valid image intensity signal. Summation block 132 is preferably comprised of a simple adder, 134, with an output latch, 136, whereby the value stored in the output latch is fed back as one of the inputs to the adder. Furthermore, the summation block would include a reset input, for example a reset input on output latch 136, which would allow a reset control signal from microprocessor 92 to reset the summation block to a zero output level.

Alternatively, summation block 132 may comprise a digital-to-analog converter (DAC) which would convert the toner mass signal to an analog signal, which could then be further processed by techniques well known to those skilled in the electronics arts. For example, the further processing may include averaging the analog toner mass signal over all or part of the output image, or accumulating the signal until a predetermined threshold level is reached, whereby the number of times the threshold level is reached would recorded by the summation block and stored therein. The advantage of this alternative is that it may allow the identification of specific regions within the image and, therefore, the output document that have a high toner coverage. Thus, various components of the electrophotographic printing machine may be regulated in accordance with the toner coverage in subsequent processing of the developed image, for example, the decurler as will be described below.

Referring, once again, to summation block 132 of FIG. 2, the summed output signal is fed back to microprocessor 92 via the output latch. In one embodiment, the microprocessor then accumulates the summed output signals (Σf(i)) over the entire image to generate a total toner mass signal representing the amount of toner which was developed on the latent electrostatic image. Alternatively, the summed output signal may be further processed by the microprocessor, for example, dividing the summed output signal generated over a single scanline by the number of pixels per scanline to achieve a per pixel average toner mass on a scanline by scanline basis.

While the present invention has been described with respect to a single color embodiment, the toner usage meter has applicability to a multi-color printing system as well. For example, a multiple-pass color printing system would utilize the toner usage meter elements in the manner previously described, however, the total toner mass signal determined for each pass would represent one of four possible color separations (cyan, magenta, yellow, or black). Similarly, a single pass multicolor system, possibly a highlight color printing system, could employ multiple usage meters, or multiplexed portions thereof, to monitor the mass of toner developed on the electrostatic latent images produced for each color.

Referring again to FIG. 1, microprocessor 92 may then provide the total toner mass signal or an average toner mass signal to one or more subsystems which are present within the electrophotographic printing machine. Developer subsystem 108 might utilize the total toner mass signal in one of many commonly known feedback control loops to determine the amount of developer material, toner and possibly carrier, that must be replenished as a result of the development of the electrostatic latent image. For example, the total toner mass signal might be substituted for the signal representing toner usage per document as described in U.S. Pat. No. 4,721,978 by Herley, the relevant portions of which have been previously incorporated herein by reference. Similarly, decurler subsystem 112 might utilize the average toner mass signal to control the amount of pressure applied to decurler rolls present therein. In this manner, the decurler would be responsive to the average amount of toner present on the surface of the output sheet, thereby providing minimal decurling when a small average total toner mass is used and maximal decurling when a large average mass of toner is used.

As represented by remote interactive communication (RIC) subsystem 116, for example, the RIC system described in U.S. patent application Ser. No. 07/771,882 by Aboujaoude et al. (filed as a continuation of application Ser. No. 07/445,809, now abandoned), the relevant portions of which are hereby incorporated by reference, microprocessor 92 may also accumulate the total toner mass used in the machine. While the accumulated mass value would require storage in a nonvolatile memory location when the machine is not in use, such an accumulated mass value could provide an indication of when the machine would require an additional supply of toner. As enabled by the RIC subsystem, such a supply could be requested by the machine itself, as described in U.S. Pat. No. 5,057,866 to Hill, Jr. et al. (Issued Oct. 15, 1991), via a telephonic link to a remote computer, upon a determination that the accumulated mass value has reached a threshold amount slightly below or equal to the previously supplied amount of toner. In other words, the RIC subsystem, in combination with the toner usage meter of the present invention, could recognize the impending exhaustion of the toner replenishment supply and automatically initiate a request for additional toner which would be transmitted to a remote system.

In recapitulation, the present invention is an apparatus for approximating the mass of toner used in developing an electrostatic latent image in a printing machine. The apparatus may be employed in single or multi-color printing systems having exposure devices which are responsive to a greyscale image intensity signal. Moreover, the present invention produces a signal approximating the amount of toner used to develop an electrostatic latent image produced by such a multilevel exposure device.

It is, therefore, apparent that there has been provided, in accordance with the present invention, an apparatus for measuring the toner used to develop an electrostatic latent image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for estimating the mass of toner developed on an electrostatic latent image, comprising:

converting means for generating a toner mass signal approximating a toner mass developed by a latent output pixel of the latent image as a function of a greyscale image intensity signal used to control the formation of the latent output pixel; and summing means, responsive to the toner mass signal, for determining a sum of the approximated toner mass for a plurality of output pixels and thereby producing a sum signal.

2. The apparatus of claim 1 wherein the converting means comprises a look-up table having a mapping function to generate the toner mass signal in response to the greyscale image intensity signal.

3. The apparatus of claim 2 wherein the look-up table comprises a programmable read-only memory.

4. The apparatus of claim 1 wherein the converting means comprises an arithmetic logic unit, having a mapping function therein, to generate the toner mass signal in response to the greyscale image intensity signal.

5. The apparatus of claim 1 further including reset means for resetting the summing means to a predefined level.

6. The apparatus of claim 1 wherein the summing means comprises:

a two input adder having a first input for receiving the approximated toner mass signal output from the converting means; and an output latch, responsive to an output pixel clock signal, for storing an output signal of the adder and providing the stored output signal as an input signal to a second input of the adder, and where the signal stored in the latch is representative of the sum of the toner mass.

7. The apparatus of claim 1 wherein the toner mass signal is a digital signal and wherein the summing means comprises:

a digital-to-analog converter for transforming the digital toner mass signal to an analog toner mass signal;

an accumulator for accumulating the toner mass signal, the output of said accumulator being a function of the number of output pixels processed by the converter and the magnitude of the analog toner mass signals associated with the output pixels.

8. The apparatus of claim 1, further including averaging means for dividing the sum of the approximated toner mass by the number of output pixels to determine an average toner mass per pixel.

9. An electrostatic printing machine of the type having an insulating member, comprising:

means for supplying a plurality of image intensity signals;

means, responsive to the image intensity signals, for recording an electrostatic latent image on the insulating member, with the electrostatic latent image having a plurality of output pixel spots, whereby the charge level of each output pixel spot is controlled in response to the associated image intensity signal;

developing means for developing the electrostatic latent image recorded on the insulating member with toner to produce a developed image on the insulating member; and means for estimating the mass of toner adhering to the insulating member as a function of the image intensity signals.

10. The electrostatic printing machine of claim 9 wherein the electrostatic latent image recording means comprises a device selected from the group consisting of a laser raster output scanner, an ionographic print head, and a light-emitting diode array.

11. The electrostatic printing machine of claim 9 further including means, responsive to the toner mass estimating means, for varying the magnitude of a decurling treatment applied to an output medium.

12. The electrostatic printing machine of claim 9 wherein the developing means further includes means, responsive to the toner mass estimating means, for replenishing toner in the developing means.

13. The electrostatic printing machine of claim 12 further including means, responsive to the toner mass estimating means, for monitoring the total mass of toner used during the development of a plurality of electrostatic latent images, said monitoring means being capable or recognizing an imminent exhaustion of a toner supply used for replenishing the toner in the development mixture whenever the total toner mass exceeds a threshold level and automatically signaling a request for additional toner.

14. The electrostatic printing machine of claim 9, wherein the toner mass estimating means comprises:

converting means for generating toner mass signals representing the approximate toner mass necessary for the development of the output spots as a function of image intensity signals associated therewith; and means, responsive to the toner mass signals generated by the converting means, for summing the toner mass signals and producing a sum signal representing the total approximated toner mass for the output spots.

15. The apparatus of claim 14 wherein the converting means comprises a look-up table, having a mapping function therein, to generate the toner mass signals in response to the image intensity signals.

16. The apparatus of claim 15 wherein the look-up table comprises a programmable read-only memory.

17. The apparatus of claim 15 further including reset means for resetting the summing means to a predefined level.

18. The apparatus of claim 14 wherein the summing means comprises:

a two input adder having a first input for receiving the approximated toner mass signals output from the converting means; and an output latch, responsive to a pixel clock signal, for storing an output signal of the adder and providing the output signal stored therein as an input signal to a second input of the adder, and where the signal stored in the latch is representative of the sum of the toner mass.

19. A method of estimating the mass of toner developed on an electrostatic latent image, comprising:

generating a toner mass signal approximating a toner mass developed by a latent output pixel of the latent image as a function of a greyscale image intensity signal used to control the formation of the latent output pixel; and determining, in response to the toner mass signal, a sum of the approximated toner mass for a plurality of output pixels to produce a sum signal.

20. The method of claim 19, wherein the step of generating a toner mass signal includes the steps of:

receiving a greyscale image intensity signal;

using the greyscale image intensity signal as an index value, accessing a look-up table, at a location determined by the index value, to obtain a toner mass value stored therein; and outputting the stored toner mass value as the toner mass signal.

21. The method of claim 19, wherein the step of determining a sum of the approximated toner mass for a plurality of output pixels includes the steps of:

latching the toner mass signal corresponding to a current latent output pixel;

adding the latched toner mass signal to a sum of a plurality of previous toner mass signals to produce a current sum;

latching, in response to a pixel clock signal, the current sum of the latent output pixel toner mass signals to produce a sum signal.

* * * * *